Dec. 9, 1969 E. POUMAKIS 3,483,539

PULSE REPOSITIONING SYSTEM

Filed March 11, 1966 2 Sheets-Sheet 1

INVENTOR
Eleuthere Poumakis

BY
Lane, Aitken, Dunner & Ziems
ATTORNEYS

PULSE REPOSITIONING SYSTEM

INVENTOR
Eleuthere Poumakis

BY Lane, Aitken, Dunner & Ziems
ATTORNEYS

United States Patent Office 3,483,539
Patented Dec. 9, 1969

3,483,539
PULSE REPOSITIONING SYSTEM

Eleuthere Poumakis, East Islip, N.Y., assignor to Potter Instrument Company, Inc., Plainview, N.Y., a corporation of New York Filed Mar. 11, 1966, Ser. No. 533,501
Int. Cl. G11b *5/00*
U.S. Cl. 340—174.1 9 Claims

ABSTRACT OF THE DISCLOSURE

This specification discloses a system for reading out high density self-clocking information stored along a magnetic track. In accordance with the system, pulses are generated for each flux transition recorded in the tape. The self-clocking information is recorded in a manner such that it is necessary to determine whether each successive pulse occurs after a predetermined short interval following the preceding pulse or after a predetermined long interval following the preceding pulse. The system improves the capability to distinguish between long and short intervals by repositioning each pulse which occurs less than a minimum short interval following a preceding pulse to occur after such minimum interval.

Figure 1:
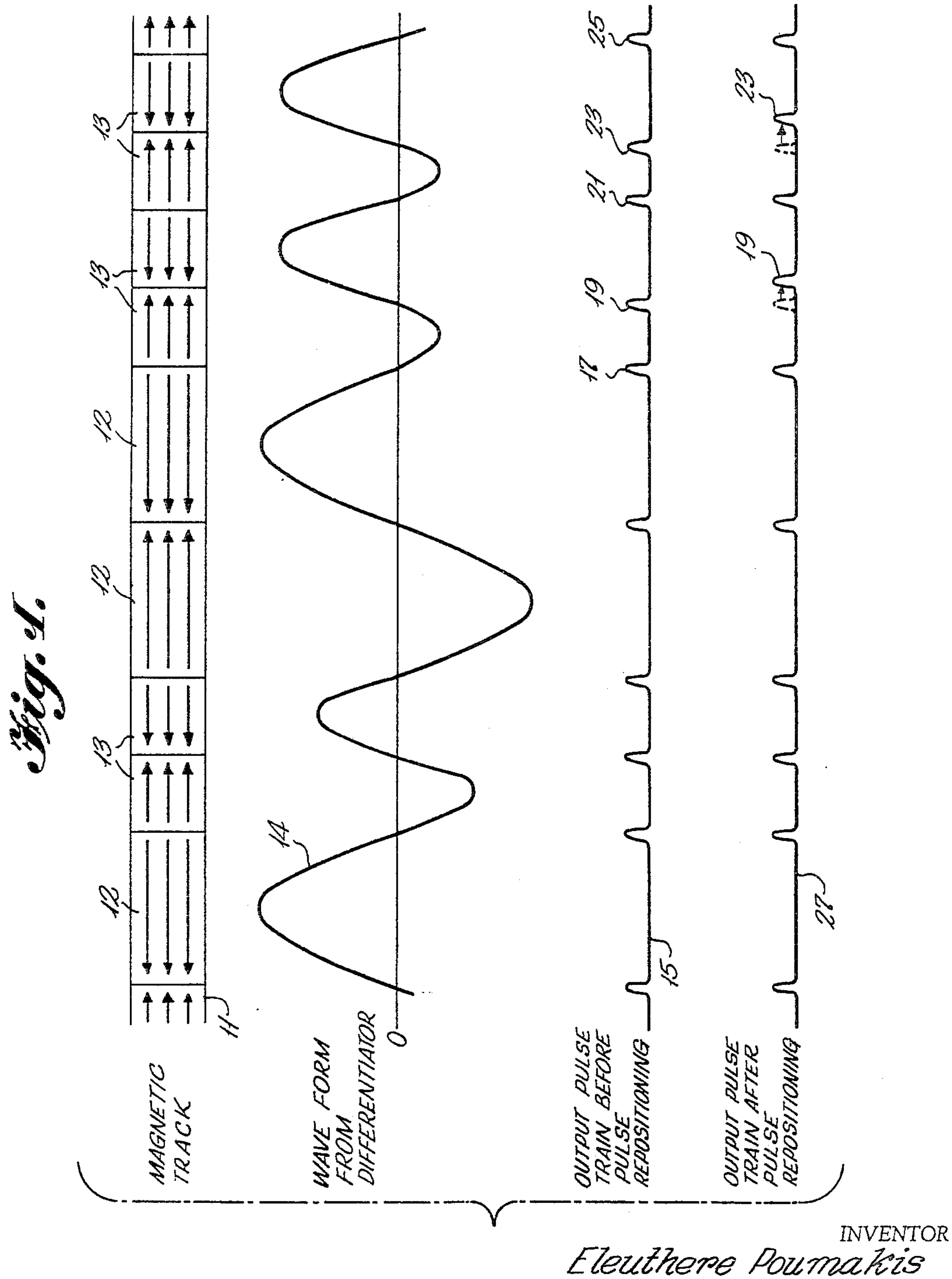

This invention relates to high density storage of digital data on magnetic tape and more particularly to a system for repositioning pulses to facilitate the distinguishing between long and short intervals between adjacent flux transitions in a high density self-clocking magnetic recording system.

In the high density storage of self-clocking binary information on magnetic tape, the information and clock pulses are represented by flux transitions between states of magnetization spaced along a track of the tape. The positions for flux transitions occur at regular intervals along the track and the self-clocking binary information is represented by the presence or absence of a transition at each transition position. The information is recorded in a manner such that two absences of flux transitions never occur at adjacent positions along the track. When the recorded flux transitions are read out, each flux transition is converted into a pulse. The resulting pulse train is then decoded to recover the binary information represented by the flux pattern. Ideally successive pulses in the pulse train produced from the pattern of flux transitions should be separated by either a predetermined long interval or a predetermined short interval one half the length of the long interval. The process of decoding the pulse train involves distinguishing between these long and short intervals.

To recover the binary information recorded in the track, the track is moved past a transducing head at a constant speed. The resulting waveform produced by the transducer is differentiated to make the flux transitions more easily recognizable. The differentiation produces an output waveform oscillating about zero with each zero crossing representing a flux transition. The zero crossings are then converted to pulses making up the pulse train to be decoded. Because of the high density with which the flux transitions are recorded the oscillating waveform sometimes undergoes a zero shift, in which the amplitude of the waveform is greater on one side of zero than on the other. When this zero shift occurs in the waveform representing a plurality of short intervals in a row alternate ones of the short intervals will be shortened and alternate ones of the short intervals will be lengthened. Some of the lengthened short intervals approach some of the long intervals in length and thus become difficult to distinguish from the long intervals. This difficulty becomes more acute as the density of the flux transitions are increased and results in a practical limit to the density with which the flux transitions can be recorded in the track and the binary information represented thereby still be successfully recovered.

To overcome the problem of zero shift the system of the present invention in effect lengthens out the short intervals to a minimum length. When a pulse occurs less than the minimum interval after the preceding pulse, the pulse is repositioned so as to occur after the minimum time interval. As a result the succeeding short interval will not be lengthened by the zero shift and thus will be easily distinguishable from a long interval. Because of the pulse repositioning system of the present invention binary information can be recorded with even greater density and still be successfully recovered upon being read out.

Accordingly, an object of the present invention is to provide an improved system for reading out from high density magnetic storage.

Another object of the present invention is to overcome the effect of zero shift in an output waveform produced when high density binary information is read out from magnetic storage.

A still further object of the present invention is to increase the density with which binary information may be stored along a magnetic track.

A still further object of the present invention is to facilitate the distinguishing between long and short intervals between flux transitions stored with high density along a magnetic track to represent self-clocking binary information.

A still further object of the present invention is to provide an improved system for distinguishing between long and short intervals between flux transitions recorded with high density along a magnetic track to represent self-clocking binary information.

Figure 2:
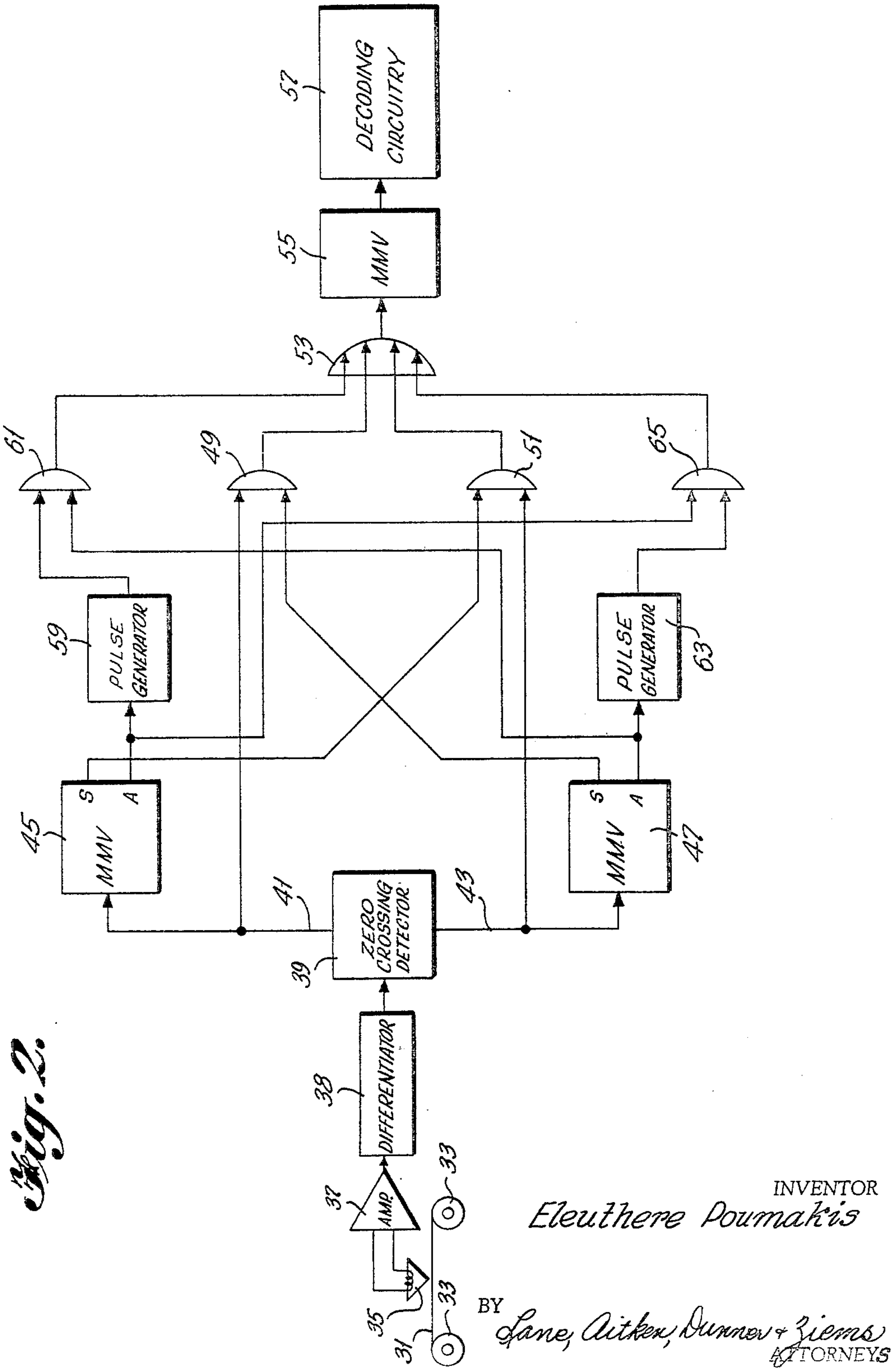

Further objects and advantages of the present invention will become readily apparent as the following detailed description of the invention unfolds and when taken in conjunction with the drawings wherein:

FIG. 1 schematically illustrates high density self-clocking magnetic recording and the waveforms that are produced when such a magnetic recording is read out; and FIG. 2 is a block diagram of the system of the present invention.

The magnetic trail 11 in FIG. 1 illustrates high density recording a self-clocking information. The recording is in the non-return-to-zero form, in which the track is magnetized either with one polarity in a direction parallel to the track, or with the opposite polarity, and the polarity is reversed at predetermined positions spaced along the track to represent the recorded information and clock pulses. Each point at which the polarity of flux reverses is a flux transition. In track 11 the arrows represents the direction of magnetization of the track and the flux transitions are represented by the line separating oppositely directed arrows. The information recorded in the track is represented by the spacing of the flux transitions along the track. The successive transitions are either spaced apart by long intervals of a predetermined length such as the intervals 12 in the track 11, or are spaced apart by short intervals half the length of the long intervals, such as the intervals 13 in the track 11. The sequence of the long and short intervals is used to encode binary information. One such code is disclosed in the copending application Ser. No. 458,110, filed May 24, 1965, now Patent No. 3,374,475 entitled High Density Recording System, and invented by Andrew Gabor.

When the magnetic track is read out, each flux transition is converted into a pulse and the resulting pulse train contains pulses separated in time by long and short intervals with the short intervals being approximately half the length of the long intervals. The information is decoded by distinguishing between these long and short intervals. The information is referred to as self-clocking because a pulse will always occur in the pulse train either after a long interval or a short interval and regularly occurring clock pulses separated by intervals corresponding to the long or short intervals in the pulse train can easily be derived from the pulse train.

When the magnetic track is moved past a magnetic read-out head in transducing relationship therewith, the flux transitions will induce a waveform in the read-out head. To make the flux transitions more easily detectable the waveform is differentiated to produce a waveform such as the waveform 14 in FIG. 1. The specific waveform 14 is exemplary of what would be produced by the specific flux transition pattern shown in track 11. Each flux transition recorded in the magnetic track will produce a zero crossing in the waveform resulting from the differentiation. The information recorded in the track is determined by detecting these zero crossings and producing an output pulse at the time of each zero crossing. The pulse train resulting from such a detecting and pulse generating operation in response to the waveform 14 is represented by the pulse train 15 in FIG. 1. As shown in the pulse train 15, a pulse is produced at each zero crossing of the waveform 14.

Because of the crowding that results from the high density from which the flux transitions are recorded on the magnetic track, the waveform that results from the differentiation sometimes undergoes a zero shift; that is, the waveform instead of oscillating about zero voltage will oscillate about some finite positive or negative voltage. A zero shift is particularly likely to occur when the flux transition pattern producing the output waveform comprises a series of short intervals in succession following one or more long intervals in succession. Such a zero shift is illustrated in the waveform 14 on the right hand side thereof. When such a zero shift occurs, alternate intervals between successive pulses in the pulse train that is produced in response to the output waveform will be shortened, and alternate intervals will be lengthened. The direction of the zero shift is always such that the first short interval of the succession of short intervals will be shortened. Thus, in the pulse train 15, the intervals between pulses 17 and 19 and between pulses 21 and 23 are shortened, and the intervals between the pulses 19 and 21 and between the pulses 23 and 25 are lengthened.

When a zero shift occurs, the ability of the read-out circuitry to distinguish between long and short intervals is deleteriously affected because the alternate ones of the successive short intervals may be interpreted as long intervals by the read-out circuitry. For example, the read-out circuitry could misinterpret the intervals between the pulses 19 and 21 and between the pulses 23 and 25 as long intervals. Since the binary information represented by the pulse train is recovered by distinguishing between the long and short intervals in the pulse train, the misinterpretation of some of the short intervals as long intervals would result in errors in the binary information that is recovered.

The system of the present invention overcomes the problem of zero shift by repositioning pulses in the pulse train produced in response to the zero crossings in the output waveform of the read-out head, so that all pulses in the pulse train are spaced by a minimum interval. Whenever a pulse occurs less than this minimum interval after the preceding pulse, it is repositioned so that it occurs after this minimum interval. For example, in pulse train 15, the interval preceding the pulse 19 and the interval preceding the pulse 23, is less than the minimum interval. Accordingly, the pulses 19 and 23 are repositioned in the pulse train so that they occur the minimum interval after the preceding pulses 17 and 21 respectively. The pulse train 27 thus results from the repositioning operation on the pulse train 15. In the pulse train 27, the previous position of the pulses 19 and 23 is illustrated in dotted lines and the small arrows indicate the repositioning of these pulses. It will be noted that the pulse repositioning not only lengthens the intervals which were shortened by the zero shift but also shortens the alternate intervals which were lengthened by the zero shift. This result is illustrated in the pulse train 27 in which the initially lengthened intervals between pulses 19 and 21 and between pulses 23 and 25 are shortened. In this manner the short intervals which are lengthened by a zero shift are shortened and are thus made readily distinguishable from the long intervals in the pulse train.

As shown in FIG. 2, which is a block diagram of the system of the present invention, a magnetic tape 31 contains the magnetic track on which the high density self-clocking information is recorded. The magnetic tape 31 is driven between two reels 33 past a magnetic read-out head 35, so that the magnetic track on the tape 31 passes in transducing relationship with the read-out head 35. The read-out head 35 will produce an output waveform which is amplified by an amplifier 37 and then applied to a differentiator 38. The differentiator will produce a waveform such as the waveform 14 in FIG. 1.

The output waveform of the differentiator 38 is applied to a zero crossing detector 39, which detects the zero crossings in the applied waveform and generates a pulse in response to each zero crossing. The zero crossing detector 39 in response to a positive going zero crossing, that is a zero crossing in which the waveform goes from the negative side of zero to the positive side, produces an output pulse on a channel 41. In response to a negative going zero crossing the zero crossing detector 39 produces an output pulse on a channel 43.

The zero crossing detector for example may be an amplifier, a clipper and a differentiator to produce positive pulses in response to positive going zero crossings and negative pulses in response to negative going zero crossings. The positive pulses are routed to the output channel 41 and the negative pulses routed to the output channel 43 by means of diode rectifiers. The negative pulses are inverted before being applied to the channel 43 so that the pulses on both channels 41 and 43 are positive.

Since the positive and negative going zero crossings of an output waveform must occur alternately, the zero crossing detector 39 will produce pulses alternately on channels 41 and 43 in response to the applied waveform from the differentiator 38. The pulses produced on channel 41 are applied to a monostable multivibrator 45 and the pulses produced on channel 43 are applied to a monostable multivibrator 47. The multivibrators 45 and 47 will be triggered to their astable states by pulses applied from the channels 41 and 43 respectively and will remain in their astable states for one microsecond, which is selected as the minimum time interval between pulses. This time interval is selected to be just slightly less than the average length of a short interval between the pulses.

The pulses produced on channel 41 are also applied to a gate 49 which will be enabled by the monostable multivibrator 47 when the monostable multivibrator 47 is in its stable state. The pulses produced on the channel 43 are applied to a gate 51 which will be enabled by the monostable multivibrator 45 when the monostable multivibrator 45 is in its stable state. When the gate 49 is enabled, the pulses applied from the channel 41 will pass through the gate 49 and then through an OR gate 53 to a monostable multivibrator 55. When the gate 51 is enabled, the pulses applied from the channel 43 will pass through the gate 51 and through the OR gate 53 to the monostable multivibrator 55. In response to each applied pulse from the OR gate 53 the monostable multivibrator applies a pulse to decoding circuitry 57. The monostable multivibrator 55 merely serves as a pulse shaper to apply pulses of the proper width to the decoding circuitry 57 in response to each applied input pulse.

If a pulse is produced on a channel 43 more than the minimum time interval of one microsecond after a pulse is produced on a channel 41, then the monostable multivibrator 45 will have already switched back to its stable state and the gate 51 will be enabled so that the pulse produced on the channel 43 will pass through the gate 51 and through the OR gate 53 to the monostable multivibrator 55. Similarly, when a pulse is produced on a channel 41 more than the minimum time interval of one microsecond after a pulse is produced on channel 43, the monostable multivibrator 47 will have already switched back to its stable state so that the gate 49 will be enabled and the pulse produced on channel 41 will pass through the gate 49 and through the OR gate 53 to the monostable multivibrator 55. If, on the other hand a pulse is produced on channel 43 less than the minimum time interval of one microsecond after a pulse is produced on channel 41, the monostable multivibrator 45 will still be in its stable state and the gate 51 will not be enabled. Accordingly, the pulse produced on channel 43 will be blocked. Similarly, if a pulse is produced on channel 51 less than the minimum time interval after a pulse is produced on channel 43, the monostable multivibrator 47 will still be in its astable state and the gate 49 will not be enabled so that the pulse produced on channel 41 will be blocked.

A pulse generator 59 is connected to receive the output waveform of the monostable multivibrator 45; and in response to the monostable multivibrator 45 switching from its astable state back to its stable state, the pulse generator 59 produces an output pulse, which is applied to a gate 61. The gate 61 is enabled whenever the monostable multivibrator 47 is in its astable state. When the gate 61 is enabled the pulse produced by the pulse generator 59 will pass through the gate 61 and then through the OR gate 53 to the monostable multivibrator 55.

A pulse generator 63 is connected to receive the output waveform produced by the monostable multivibrator 47; and in response to the monostable multivibrator 47 switching back from its astable state to its stable state, the pulse generator 63 will produce an output pulse, which is applied to the gate 65. The gate 65 will be enabled whenever the monostable multivibrator 45 is in its astable state. Whenever the gate 65 is enabled and a pulse is applied thereto by the pulse generator 63, the pulse will pass through the gate 65 and through the OR gate 53 to the monostable multivibrator 55.

Since the monostable multivibrators 45 and 47 switch back to their stable states one microsecond after being triggered, the pulse generator 59 will produce an output pulse one microsecond after each pulse is produced on channel 41 and the pulse generator 63 will produce an output pulse one microsecond after each pulse is produced on channel 43.

If a pulse is produced on channel 43 less than the minimum time interval of one microsecond after the preceding pulse on channel 41, then when the pulse generator 59 produces an output pulse after one microsecond the monostable multivibrator 47 will be in its astable state. Accordingly, the gate 61 will be enabled and the pulse produced by the pulse generator 59 will pass through the gate 61 and then through the gate 53 to the monostable multivibrator 55. Thus, whenever a pulse is produced on channel 43 less than one microsecond after a pulse is produced on channel 41, the pulse produced on channel 43 will be blocked and the pulse produced by the pulse generator 59 after one microsecond will not be blocked and will pass through the OR gate 53 to the monostable multivibrator 55. In this manner a pulse occuring on channel 43 less than the minimum time interval of one microsecond after the preceding pulse in channel 41 is repositioned to occur after one microsecond.

Similarly, whenever a pulse is produced on channel 41 less than one microsecond after a pulse is produced on channel 43, the monostable multivibrator 45 will be in its astable state when the pulse generator 63 produces its output pulse one microsecond after the pulse on channel 43 is produced. Accordingly, the pulse produced by the pulse generator 63 will pass through the gate 65 and through the OR gate 53 to the monostable multivibrator 55. Accordingly, a pulse occurring on channel 41 less than one microsecond after a pulse occurs on channel 43 is repositioned to occur one microsecond after the pulse on channel 43.

Thus, in the pulse train produced at the output of the OR gate 53, no two pulses occur with a spacing of less than the minimum time interval of one microsecond.

As stated above, the monostable multivibrator 55 produces an output pulse of the proper width in response to each applied pulse, which output pulse is applied to the decoding circuitry 57. The decoding circuitry 57 distinguishes between long and short intervals spacing the applied pulses and uses this information to decode the applied pulse train into binary information. Because of the pulse repositioning operation carried out by the system of FIG. 2, the decoding circuitry 57 can readily distinguish between long and short intervals, even though a zero shift occurs in the output waveform of the differentiator 38. Because the system of the present invention overcomes this problem of zero shift, the information can be recorded on the magnetic tape 31 with even greater density than was possible in the prior art and still be successfully recovered.

The above description is of a preferred embodiment of the invention and many modifications may be made thereto without departing from the spirit and scope of the invention which is defined in the appended claims.

What is claimed is:

1. A digital information system comprising a pulse train source for generating a first pulse train representing digital information, and pulse repositioning means responsive to first pulse train for generating a second pulse train in which the pulses have the same time spacing as the pulses of said first train except that each pulse in said first pulse train which occurs less in a prodetermined minimum time interval after the preceding pulse in said first pulse train is repositioned in said second pulse train to occur said minimum time interval after the preceding pulse in said second pulse train.

2. A digital information system as recited in claim 1 wherein said pulse train source has first and second output channels and generates the pulses of said first pulse train alternately on said first and second channels.

3. A digital information system as recited in claim 2 wherein said pulse repositioning means comprises a first monostable means having a stable state and an astable state and responding to pulses produced on said first channel to be triggered to said astable state for said predetermined minimum time interval, second monostable means having a stable state and an astable state and responding to each pulse produced on said second channel to be triggered to its astable state for said predetermined minimum time interval, a first gate connected to receive the pulses produced on said first channel and connected to be enabled by said second monostable means only when said second monostable means is in its stable state, a second gate connected to receive the pulses produced on said second channel and connected to be enabled by said first monostable means only when said first monostable means is in its stable state, a third gate connected to be enabled only when said second monostable means is in its astable state, means to apply a pulse to said third gate each time said first monostable means switches back from its astable state to its stable state, a fourth gate connected to be enabled only when said first monostable means is in its astable state, and means to apply a pulse to said fourth gate each time said second monostable means switches back from its astable state to its first stable state.

4. A digital information system as recited in claim 1 wherein said pulse train source comprises means defining a magnetic track having high density digital information recorded therein and means to read out the information recorded in said track to produce said pulse train.

5. A digital information system as recited in claim 4 wherein said means to read out the information recorded ins said track comprises a magnetic read-out means adapted to perform transducing operations on said track to produce an oscillating waveform, and zero crossing detecting means to produce an output pulse in response to each zero crossing in said waveform to produce said first pulse train.

6. A digital information system as recited in claim 5 wherein said zero crossing detecting means produces each pulse of said first pulse train in response to each positive going zero crossing on a first channel and produces each pulse of said first pulse train in response to each negative going zero crossing on a second channel.

7. A digital information system as recited in claim 6 wherein said pulse repositioning means comprises a first monostable means having a stable state and an astable state and responding to each pulse produced on said first channel to be triggered to its astable state for said predetermined minimum time interval, second monostable means having a stable state and an astable state and responding to each pulse produced on said second channel to be triggered to its astable state for a said predetermined minimum time interval, a first gate connected to receive the pulses produced on said first channel and connected to be enabled by said second monostable means only when said second monostable means is in its stable state, a second gate connected to receive the pulses produced on said second channel and connected to be enabled by said first monostable means only when said first monostable means is in its stable state, a third gate connected to be enabled only when said second monostable means is in its astable state, means to apply a pulse to said third gate each time said first monostable means switches back from its astable state to its stable state, a fourth gate connected to be enabled only when said first monostable means is in its astable state, and means to apply a pulse to said fourth gate each time said second monostable means switches back from its astable state to its stable state.

8. A pulse repositioning system comprising first and second input channels for receiving alternate pulses of a pulse train, first monostable means having a stable state and an astable state and responding to each pulse produced on said first channel to be triggered to its astable state for a predetermined time interval, a second monostable means having a stable state and an astable state and responding to each pulse produced on said second channel to be triggered to its astable state for said predetermined time interval, a first gate connected to receive the pulses produced on said first channel and connected to be enabled by said second monostable means only when said second monostable means is in its stable state, a second gate to receive the pulses produced on said second channel and connected to be enabled by said first monostable means only when said first monostable means is in its stable state, a third gate connected to be enabled only when said second monostable means is in its astable state, means to apply a pulse to said third gate each time said first monostable means switches back from its astable state to its stable state, a fourth gate connected to be enabled only when said first monostable means is in its astable state, and means to apply a pulse to said fourth gate each time said second monostable means switches back from its astable state to its stable state.

9. A method of processing high density self-clocking binary information recorded in a magnetic track as a pattern of flux transitions spaced along said track comprising the steps of moving said magnetic track past a read-out station, generating a pulse in response to each flux transition passing said station to produce a pulse train, and repositioning each pulse in said pulse train which occurs less than a predetermined minimum time interval after the preceding pulse in said pulse train to occur said minimum time interval after the preceding pulse.

References Cited

UNITED STATES PATENTS

| | | | |
|---|---|---|---|
| 3,164,815 | 1/1965 | Applequist -------- | 340—174.1 |
| 3,217,329 | 11/1965 | Gabor ----------- | 340—174.1 |

TERRELL W. FEARS, Primary Examiner

VINCENT P. CANNEY, Assistant Examiner